United States Patent [19]

Hiramitsu et al.

[11] Patent Number: 4,561,324

[45] Date of Patent: Dec. 31, 1985

[54] STEERING WHEEL

[75] Inventors: Tetsushi Hiramitsu, Kasugai; Hiroshi Sugita, Ichinomiya; Satoshi Ono, Inazawa; Zenzaburo Murase, Konan, all of Japan

[73] Assignee: Toyoda Gosei Co., Ltd., Nishikasugai, Japan

[21] Appl. No.: 564,192

[22] Filed: Dec. 22, 1983

[30] Foreign Application Priority Data

Dec. 24, 1982 [JP] Japan ................. 57-233139

[51] Int. Cl.⁴ .............................................. B62D 1/20
[52] U.S. Cl. .................................. 74/498; 74/802
[58] Field of Search ................... 74/498, 802, 409

[56] References Cited

U.S. PATENT DOCUMENTS

| | | | |
|---|---|---|---|
| 1,157,068 | 10/1915 | Vincent | 74/802 |
| 1,224,869 | 5/1917 | Peterson | 74/498 |
| 1,425,678 | 8/1922 | Newhouse | 74/498 |
| 1,637,847 | 8/1927 | Baker | 74/498 |
| 2,295,299 | 9/1942 | Shaw, Jr. | 74/802 |
| 2,631,308 | 3/1953 | Hutchinson | 74/802 |
| 3,448,828 | 6/1969 | Goldberg | 74/802 |
| 3,610,067 | 10/1971 | Stibbe | 74/498 |
| 4,093,180 | 6/1978 | Strabola | 74/802 |
| 4,265,142 | 5/1981 | Watanabe | 74/802 |

FOREIGN PATENT DOCUMENTS 49-17167 4/1974 Japan.

*Primary Examiner*—Henry C. Yuen
*Attorney, Agent, or Firm*—Cushman, Darby & Cushman

[57] ABSTRACT

A steering wheel of the stationary pad type includes a steering shaft carrying thereon a boss plate, a first sun gear secured to a column and a second sun gear secured to a pad. At least one planetary shaft is rotatably supported on the boss plate, and has one end on which a first planetary gear meshing with the first sun gear is supported, while a second planetary gear meshing with the second sun gear is supported on the other end of the planetary shaft. The first and second planetary gears are normally held by a resilient device in intimate engagement with the first and second sun gears, respectively, but displaceable therefrom in the event foreign matter is caught between the planetary and sun gears.

5 Claims, 4 Drawing Figures

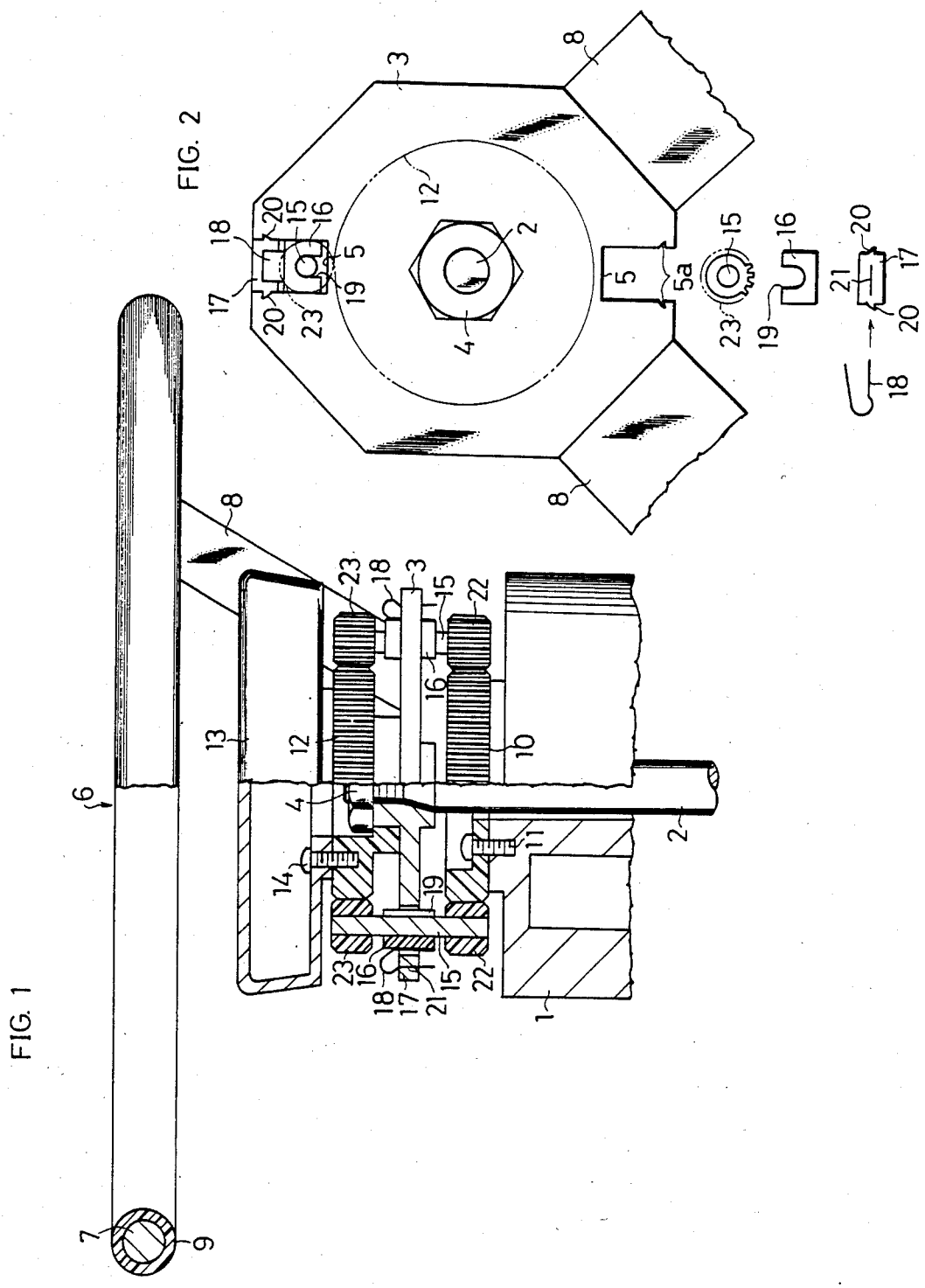

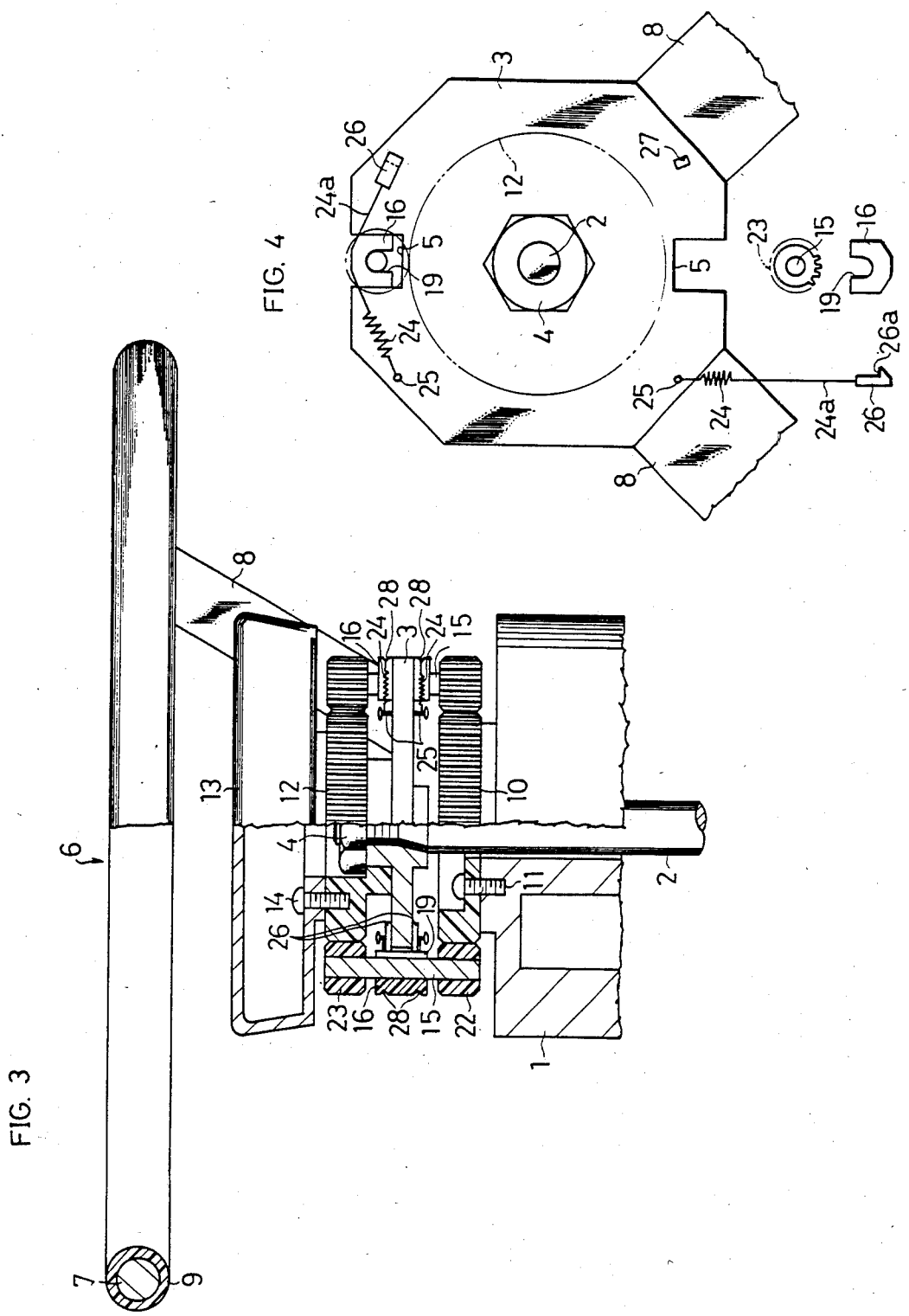

STEERING WHEEL

BACKGROUND OF THE INVENTION

1. Field of the Invention

This invention relates to a steering wheel of the stationary pad type having a planetary gear, and more particularly, to a structure for the engagement of a planetary gear with a sun gear in a steering wheel.

2. Description of the Prior Art

There is known a steering wheel of the stationary pad type having a planetary gear system. The backlash of the gears, however, produces an abnormal noise which has an adverse effect on the smooth operability of the wheel and gives it the impression of being inferior in quality.

SUMMARY OF THE INVENTION

It is an object of this invention to provide a steering wheel which does not have any backlash between a sun gear and a planetary gear causing vibration or making an abnormal noise.

It is another object of this invention to provide a steering wheel which is smoothly operable even if any foreign matter may be caught between a sun gear and a planetary gear.

Other objects, features and advantages of this invention will become apparent from the following detailed description and the accompanying drawings.

BRIEF DESCRIPTION OF THE DRAWINGS

FIG. 1 is a side elevational view, partly in section, of a steering wheel according to a first embodiment of this invention;

FIG. 2 is an exploded front elevational view of the steering wheel shown in FIG. 1;

FIG. 3 is a view similar to FIG. 1, but showing a steering wheel according to a second embodiment of this invention; and FIG. 4 is an exploded front elevational view of the steering wheel shown in FIG. 3.

DETAILED DESCRIPTION OF THE INVENTION

Referring to FIGS. 1 and 2 showing a first embodiment of this invention, a steering shaft 2 extends through a column 1 in an automobile, and has one end to which a boss plate 3 is secured by a nut 4. The boss plate 3 is generally octagonal as shown in FIG. 2, and has a pair of outwardly open recesses 5 formed at its upper and lower ends, respectively. The boss plate 3 is also provided with a pair of notches 5a facing each other across each recess 5. A steering ring 6 has a core 7 supported by a plurality of spokes 8 extending from the boss plate 3. The core 7 is covered by a urethane resin layer 9.

A first sun gear 10 formed from, for example, a synthetic resin is secured to the column 1 by a plurality of bolts 11. The steering shaft 2 extends freely through the center of the sun gear 10. A second sun gear 12, which is likewise formed from, for example, a synthetic resin, is supported by the nut 4 rotatably on the steering shaft 2. The sun gears 10 and 12 have an equal number of teeth. A pad 13 on which various switches and indicators not shown can be mounted is attached to the second sun gear 12 by a plurality of bolts 14.

A pair of planetary shafts 15 are rotatably supported by the boss plate 3. Each planetary shaft 15 is mounted in one of the recesses 5 by a bearing member 16, a supporting member 17 and a holding leaf spring 18, as shown in FIG. 2. The bearing member 16 is channel-shaped in front elevation as shown in FIG. 2, and has a groove 19 which faces the bottom of the recess 5 and in which the planetary shaft 15 is rotatably supported. The supporting member 17, which is also disposed in the recess 5, is slightly outwardly spaced apart from the bearing member 16. The supporting member 17 is provided on the opposite sides thereof with a pair of projections 20 each engaged in one of the recesses 5a to hold the supporting member 17 in position. The holding spring 18 is generally U-shaped, and has one end anchored in a slit 21 in the supporting member 17, while the other end of the spring 18 is secured between the bearing member 16 and the supporting member 17. The spring 18 bears on the bearing member 16 and thereby urges the planetary shaft 15 inwardly. A pair of planetary gears 22 and 23 are provided on the opposite ends, respectively, of each planetary shaft 15, and have an equal number of teeth. The first planetary gear 22 is located adjacent to the column 1 and engaged with the first sun gear 10, while the second planetary gear 23 located adjacent to the pad 13 is engaged with the second sun gear 12. The force of the spring 18 is transmitted by the planetary shaft 15 to the planetary gears 22 and 23 to maintain them in engagement with the sun gears 10 and 12, respectively. As the boss plate 3 is rotated for the steering operation, the planetary gears 22 and 23 are caused to rotate about their own axes, and about the sun gears 10 and 12, respectively.

When the steering wheel is rotated, the sun gear 12 located adjacent to the pad 13 is stationary, since the sun gear 10 located adjacent to the column 1 is unrotatable, and since the sun gears 10 and 12 have an equal number of teeth, while the planetary gears 22 and 23 also have an equal number of teeth. Therefore, the pad 13 secured to the sun gear 12 always remains stationary relative to the column 1 despite the steering operation.

If the steering wheel is rotated, the planetary gears 22 and 23 are caused to rotate about the sun gears 10 and 12, respectively, while rotating freely about their own axes. As the planetary gears 22 and 23 are held in intimate engagement with the sun gears 10 and 12 by the springs 18, there is no backlash of the gears causing vibration or making an abnormal noise. Even if any foreign matter may be caught between a particular planetary gear or gears 22 and 23 and the corresponding sun gear or gears 10 and 12, it does not obstruct the steering operation, since each supporting member 17 is spaced apart from the corresponding bearing member 16 to enable the planetary shaft 15 to be radially outwardly displaced against the force of the spring 18 to allow the outward displacement of the planetary gears 22 and 23 to move over the foreign matter.

A second embodiment of this invention is shown in FIGS. 3 and 4. It differs from the first embodiment in the structure employed for mounting each planetary shaft 15 in the corresponding recess 5 of the boss plate 3. According to the second embodiment, a pair of coil springs 24 are provided on each side of the boss plate 3. One of the springs 24 on each side of the boss plate 3 is so located as to extend across one of the recesses 5, while the other spring 24 extends across the other recess 5. Each spring 24 has one end fastened by a pin 25 to the boss plate 3 on one side of the recess 5, and includes a straight portion 24a extending across the recess 5. The straight portion 24a terminates in a locking member 26 having a projection 26a. The boss plate 3 is provided on each side thereof with a pair of locking holes 27 each located on the opposite side of one of the recesses 5 from the pin 25. The locking projection 26a on each spring 24 is engaged in one of the holes 27.

A bearing member 16 having a groove 19 is fitted in each recess 5, and the planetary shaft 15 is rotatably supported in the groove 19. The bearing member 16 is formed on its outer surface with a pair of guide grooves 28 lying in parallel to the boss plate 3. The straight portion 24a of each spring 24 extends along one of the grooves 28 in a stretched shape by virtue of the force of the coiled portion of the spring. The springs 24, thus, urges the planetary shaft 15 radially inwardly of the boss plate 3 to maintain the planetary gears 22 and 23 in intimate engagement with the sun gears 10 and 12, respectively. Therefore, the same results as those herebefore described with reference to the first embodiment can be obtained. Although the straight portion 24a has been described as being an integral part of each spring 24, it is alternatively possible to use a combination of a coiled spring and a separate wire of steel, nylon or other material connected thereto.

As is obvious from the foregoing description, the steering wheel of this invention does not have any backlash between the sun and planetary gears causing vibration or making an abnormal noise, and is smoothly operable even if any foreign matter may be caught between the sun and planetary gears.

The invention has been described by way of example with reference to the preferred embodiments thereof. It is to be understood that variations or modifications may be easily made by anybody of ordinary skill in the art without departing from the scope of this invention which is defined by the appended claims.

What is claimed is:

1. A steering wheel comprising:
    a steering shaft carrying thereon a boss plate, a first sun gear secured to a column and a second sun gear secured to a pad, said boss plate being rotatable with said steering shaft, said sun gears being rotatable relative to said steering shaft;
    at least one planetary shaft having one end on which a first planetary gear meshing with said first sun gear is supported, while a second planetary gear meshing with said second sun gear is supported on the other end of said planetary shaft, said first and second planetary gears being rotatable about said first and second sun gears, respectively, while rotating about their own axes;
    means for resiliently urging said first and second planetary gears to normally maintain them in intimate engagement with said first and second sun gears, respectively, while allowing displacement of said first and second planetary gears from said first and second sun gears, respectively; said boss plate is provided at its outer periphery with at least one recess in which said planetary shaft is rotatably supported by a bearing member and said urging means comprises a resilient device urging said bearing member radially of said sun gears.

2. A steering wheel as set forth in claim 1, wherein said resilient device comprises a leaf spring having one end bearing against the surface of said bearing member remote from the center of said boss plate, the other end of said spring being secured to a supporting member in said recess.

3. A steering wheel as set forth in claim 2, wherein said boss plate has a pair of notches formed respectively in the opposite sidewalls defining said recess therebetween, said supporting member having a pair of projections each engaged removably in one of said notches to hold said supporting member in said recess.

4. A steering wheel as set forth in claim 1, wherein said resilient device comprises a pair of coil springs each provided on one side of said boss plate and bearing against the surface of said bearing member remote from the center of said boss plate, each of said springs having one end secured to said boss plate on one side of said recess, while the other end thereof is connected to said boss plate on the opposite side of said recess from said one end thereof.

5. A steering wheel as set forth in claim 4, wherein said other end of said each coil spring is removable from said boss plate.

* * * * *